Dec. 1, 1970   J. D. RUSSELL   3,543,568
STRAIN GAGE ASSEMBLY
Filed Dec. 13, 1967
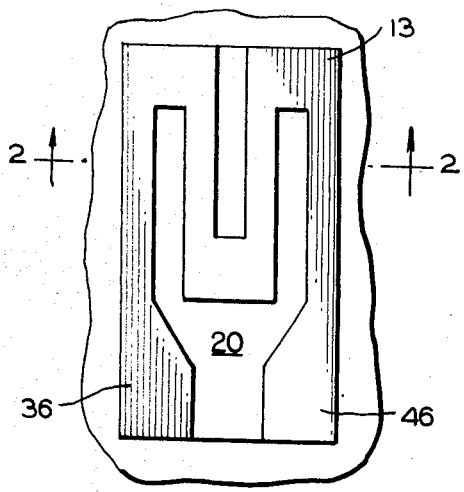
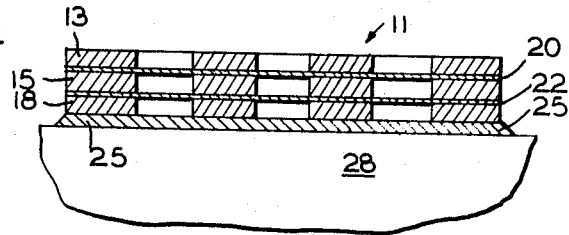
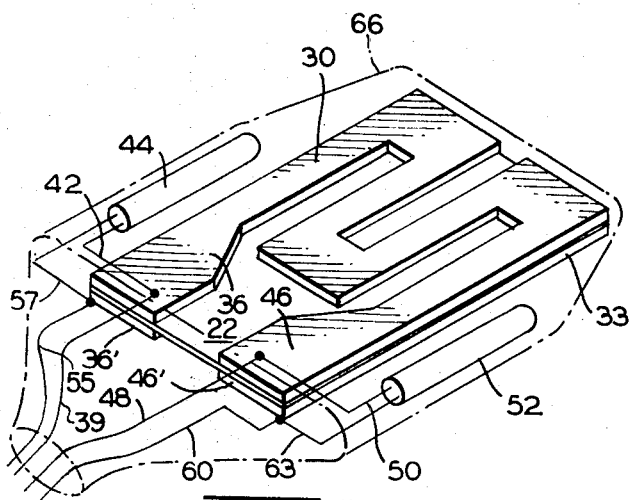
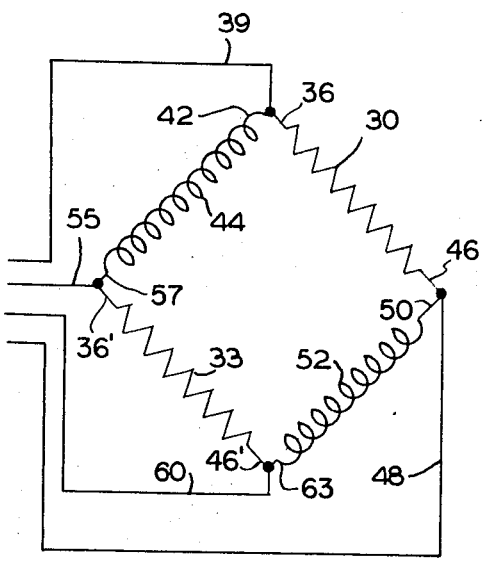
INVENTOR
JOHN D. RUSSELL
BY McCarthy, Depaoli & O'Brien
ATTORNEY 3,543,568
STRAIN GAGE ASSEMBLY
John D. Russell, 26878 Sea Vista Drive,
Malibu, Calif. 90265
Filed Dec. 13, 1967, Ser. No. 690,134
Int. Cl. G01b 7/18
U.S. Cl. 73—88.5     7 Claims

ABSTRACT OF THE DISCLOSURE

A strain gage assembly for determining the reaction of a test specimen to forces exerted thereon has a plurality of foil-type strain gages arranged to react identically to strains experienced by the test specimen with the strain gages being axially aligned and stacked one upon another and separated by electrically insulating and adhesive bonding material, with the separation of said gages effected by the material therebetween being insufficient to cause a gage in the stack to react significantly different from its adjacent gage in the stack.

DESCRIPTION

This invention is concerned with a novel arrangement of strain gages and to a strain gage unit which can be applied without further assembling to a test specimen for determination of certain mechanical properties of the specimen.

Strain gages have been used for a number of years to test various mechanical properties of materials, usually metal sheets and rods. By bonding a strain gage to the metal and subjecting the test specimen to tensile, compression, bending, torsion and other tests, changes in the electrical resistance of the strain gage may be observed and recorded and used to determine the worth of the test specimen under various conditions. Changes in strain gage resistance under test conditions are necessarily small, usually in the range of mircroohms and it often is desirable to magnify the resistance change by using two or more gages in the test. A side-by-side arrangement of gages is known but this necessarily tests different portions of the test specimen. Also, it is known to provide strain gages on opposite portions of a test specimen, for example, on either side of a specimen about to undergo a bending test. In such situations the reaction of each gage is opposite to the other and resistance changes can be so measured as to reinforce each other; however, this is still a test of different portions of the specimen.

In this invention, two or more strain gages of the membrane or foil type are stacked, one atop another axially. An object of this invention is to provide two or more strain gages installed to react identically to any strains in the test specimen and, at the same time, to occupy as small an area of the test specimen as possible. In this way the unbalance of the Wheatstone bridge used to measure changes in resistance of the strain gage during the test procdure may be doubled, tripled, etc., so that a coarser instrument than in the usual situation may be used, or else finer readings and more sensitive testing procedures may be developed. When the gage assembly comprises an even number of gages, each pair may advantageously be connected to oppositely located arms of the Wheatstone bridge.

Insulating material is provided in the stack between the individual foil-type gage elements. Such insulating material is thin, so as to provide electrical insulation, without being so thick as to cause elements higher in the stack, that is, further from the test specimen, to react significantly differently during the test from a gage element or elements lower in the stack. Thus, this insulating material may be on the order of about 0.001 inch in thickness. The insulating layers also contain adhesive material sufficient to bond the insulating layers tightly and uniformly to their adjacent gage elements. The insulating layers may be made of adhesive-coated insulating material, such as paper, or they may be of certain resinous materials which have both insulating and adhesive properties.

The usefulness of the stacked strain gage arrangement according to this invention may be increased by providing each gage of the stack with integral leads and encapsulating the assembly within a suitable package, for example, a plastic sheath. Thus leads may be attached in conventional fashion, e.g. by welding or soldering, to each gage before assembly as part of the manufacturing procedure. After assembly of the stack of gages the stack may be encapsulated by known packaging techniques so that at the point of use the stack need merely be bonded to the test specimen and the leads connected to the remainder of the Wheatstone bridge apparatus. In a preferred embodiment of this invention an even number of stacked gages is provided, along with two dummy gages or resistors, in an encapsulated unit having integral bonded leads, suitable for bonding to the test specimen and connection to the test meter and power source without further assembling.

The invention will be better understood by reference to the accompanying drawing in which FIG. 1 is a top view of a gage assembly according to this invention;

FIG. 2 is a cross-sectional view along the line 2—2 of FIG. 1, in which the gage assembly is bonded to a test piece;

FIG. 3 is a perspective view of a gage assembly containing dummy gages; and

FIG. 4 is a schematic of the bridge arrangement formed by the gage assembly of FIG. 3.

A gage assembly such as indicated generally at 11 consists of a plurality of axially aligned strain gage elements; as shown, three elements 13, 15 and 18 may be employed. These elements are stacked with insulating layers 20 and 22 therebetween. An insulating bonding layer 25 is also provided between the gage assembly 11 and the test specimen 28.

As shown in FIG. 3, the gage assembly may be a "prepackaged" bridge arrangement in which strain gages and dummy gages are provided in a self-contained unit which may be bonded in its entirety to a test specimen.

In this embodiment, the package comprises upper and lower gage elements 30 and 33 respectively. One leg 36 of upper gage 30 is provided with a lead 39 to a power source (not shown) and 42 to a dummy gage or resistor 44. This dummy gage is of high resistance, comparable to the resistance of the strain gages 30 and 33 and may be shaped, for example, like a tiny spring. As shown in FIG. 3, this resistor is enclosed in a protective sheath. The other leg 46 of the upper gage 30 is provided with a lead 48 to a galvanometer (not shown) and with a lead 50 to a second dummy gage 52.

Lower strain gage 33 has one leg 36' connected to a lead 55 to the other side of the galvanometer from lead 48. Leg 36' of gage 33 is also provided with the lead 57 to the other side of dummy gage 44 from the lead 42. The other leg 46' of lower gage 33 is provided with a lead 60 to the other terminal of the power source (not shown) from the lead 39 and also the lead 63 to the other side of dummy gage 52 from the lead 48.

This bridge arrangement is of the "unbalanced" type and, if connected to a galvanometer suitably calibrated, provides a ready means for determining the reaction of a test specimen to forces applied to it. This bridge arrangement serves to reinforce the current deflecting the galvanometer. It can be readily see that when all the resistors or gages 30, 33, 44 and 52 are of equal resistance, the current passing through the leads 39 and 60 will be evenly divided between the two branches of the bridge. When the bridge is thus balanced, the galvanometer will not be deflected. When a force is exerted on the test specimen, both strain gages 30 and 33 will react in the same way. Thus, if the resistance of gage 30 increases, current will be diverted to the dummy resistor 44 side of the bridge. If gage 33 were another dummy gage, the resistance of both gages 33 and 52 would be balanced and there would be a current flow through the galvanometer consisting of the incremental flow through the gage 44, so that flow through gages 33 and 52 will be equalized. Where, however, gage 33 is a strain gage which reacts in exactly the same way as gage 30, there will be a greater diversion of electric current throuhg the galvanometer, in the same direction. Thus, each of the stacked strain gages reinforces the effect on the galvanometer of the others and coarser instrumentation may be used than would otherwise be permissible to determine the effect of the force on the test specimens.

In FIG. 3, the assemblage is shown encapsulated in a suitable package 66 which is shown in phantom lines. This package encloses the stack of strain gages, the dummy resistors 44 and 52 and the portions of the leads 39, 48, 55 and 60 adjacent to the gages.

What is claimed is:

1. A strain gage assembly for determining the reaction of a test specimen to forces exerted thereon comprising a plurality of foil-type strain gages arranged to react identically to strains experienced by the test specimen, said strain gages being axially aligned and stacked one upon another, electrically insulating and adhesive bonding material disposed between adjacent gages in the stack, the separation of said gages effected by said material therebetween being insufficient to cause a gage in the stack to react significantly different from its adjacent gage in the stack.

2. The assembly according to claim 1 in which the insulating material is on the order of about 0.001 inch thick.

3. The assembly according to claim 1 in which each gage element is provided with integral bonded leads.

4. The assembly according to claim 3 in which the stack of gages is encapsulated in a package with said leads extending out of said package.

5. The assembly according to claim 1 in which a pair of gages is provided with integral bonded leads for attachment to opposite sides of a Wheatstone bridge.

6. The assembly according to claim 5 in which said pair of gages are electrically joined by dummy gages which form the other portions of said Wheatstone bridge.

7. The assembly according to claim 6 in which the stack of gages and the dummy gages are encapsulated in a package with leads extending out of said package for connection to an electrical meter and a power source.

References Cited
UNITED STATES PATENTS 3,263,199 7/1966 Zandman _____ 338—2
3,278,881 10/1966 Anderson et al. _____ 338—2

CHARLES A. RUEHL, Primary Examiner

U.S. Cl. X.R.

338—2